United States Patent
Clauss et al.

Patent Number: 5,964,207
Date of Patent: Oct. 12, 1999

[54] CRANKCASE VENTING SYSTEM FOR AN INTERNAL COMBUSTION ENGINE

[75] Inventors: Roland Clauss, Esslingen; Georg Leipner, Hochdorf; Willy Treyz, Neckartailfingen, all of Germany

[73] Assignee: Daimler Chrysler A.G., Stuttgart, Germany

[21] Appl. No.: 09/037,382

[22] Filed: Mar. 10, 1998

[30] Foreign Application Priority Data

Mar. 11, 1997 [DE] Germany ............................ 197 09 910

[51] Int. Cl.$^6$ ...................................................... F02B 25/06
[52] U.S. Cl. ........................................... 123/572; 123/573
[58] Field of Search .................... 123/572, 573, 123/574

[56] References Cited

U.S. PATENT DOCUMENTS

| | | |
|---|---|---|
| 4,834,028 | 5/1989 | Oetting .................................... 123/573 |
| 4,901,703 | 2/1990 | Humphries . |
| 5,027,783 | 7/1991 | Von Riesen .............................. 123/572 |
| 5,205,265 | 4/1993 | Kashiyama et al. ..................... 123/572 |
| 5,429,101 | 7/1995 | Uebelhoer et al. ...................... 123/572 |
| 5,456,239 | 10/1995 | Henderson et al. ..................... 123/572 |
| 5,878,731 | 3/1999 | Bedkowski .............................. 123/573 |

Primary Examiner—John Kwon
Attorney, Agent, or Firm—Klaus J. Bach

[57] ABSTRACT

In a crankcase venting system for an internal combustion engine having an engine intake duct including a throttle valve, a partial load venting line extending from the engine to the intake duct downstream of the throttle valve and including a vent line throttle and a full load venting line connected to the engine and leading to the intake duct upstream of the throttle valve, an aspiration line extends between the intake duct upstream of the throttle valve and the partial load venting line for controlling the vacuum generated in the partial load venting line.

4 Claims, 1 Drawing Sheet

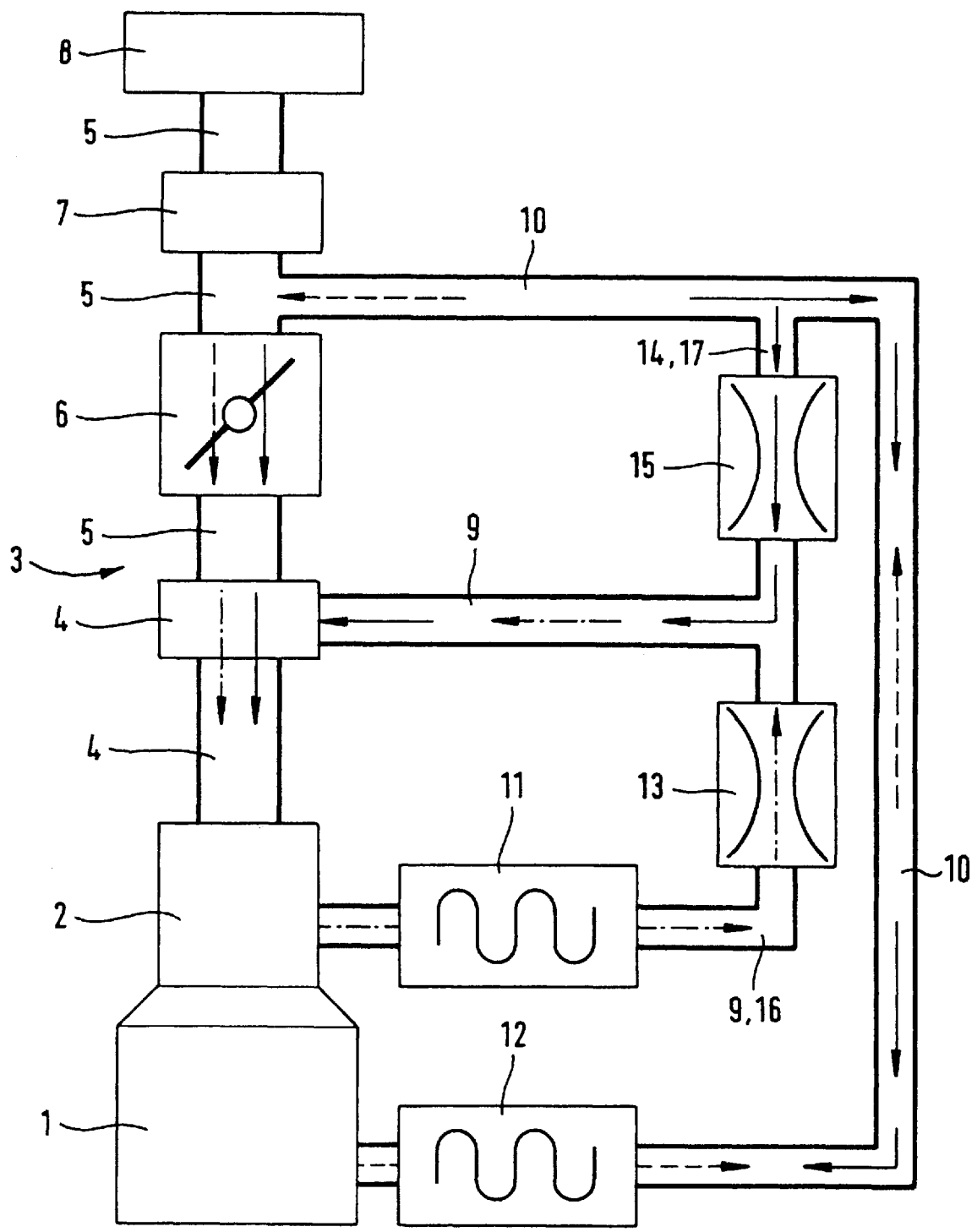

CRANKCASE VENTING SYSTEM FOR AN INTERNAL COMBUSTION ENGINE

BACKGROUND OF THE INVENTION

The invention relates to a crankcase venting system for an internal combustion engine including a partial load venting line leading to an engine intake duct downstream of a throttle valve of an engine intake system and a full load venting line connected to the engine intake duct upstream of the throttle valve.

Such a crankcase venting system is disclosed for example in DE 38 24 791 A1. The crankcase ventilating system described therein includes a main venting passage leading to the intake duct in the throttle valve housing and by way of a main throttling passage, an auxiliary venting passage which is arranged downstream the throttle valve and which is also a throttling passage and a venting line extending from the engine to the throttle valve housing. In order to prevent the development of ice at the throttle valve by the formation of condensate in the mixing area of fresh air with venting gases, the throttle valve housing is in communication with the cooling circuit so as to be heated thereby.

It is however a disadvantage of this arrangement that it requires a relatively complicated and expensive heating arrangement for the throttle valve housing in order to prevent the formation of ice therein. And in any case, ice formation in the throttle valves is prevented only when the engine is running since the throttle valve is not heated when the engine is shut down.

For general technical background information, reference is further made to DE 37 26 332 C1 and DE 19 16 788 C3.

It is the object of the present invention to provide a crankcase venting system for an internal combustion engine which insures sufficient venting of the engine crankcase under all engine operating conditions and wherein at the same time ice formation at the throttle valve is prevented without any additional special measures.

SUMMARY OF THE INVENTION

In a crankcase venting system for an internal combustion engine having an engine intake duct including a throttle valve, a partial load venting line extending from the engine to the intake duct downstream of the throttle valve and including a vent line throttle, and a full load venting line connected to the engine and leading to the intake duct upstream of the throttle valve, an aspiration line extends between the intake duct upstream of the throttle valve and the partial load venting line for controlling the vacuum generated in the partial load venting line.

The invention provides for an expansion of the operating range of the partial load venting procedure up into the full load operating range of the internal combustion engine without expensive constructional features simply by adding a venting line to the crankcase for venting during partial load engine operation. The operating range for partial load venting is extended thereby to about 80% of the load range. Full load venting becomes increasingly effective only above this range until, at full load only the full load venting system is effective. Fluid which may cause icing flows through the throttle valve only during full load operation. This fluid bypasses the throttle valve during partial load engine operation. However, powerful engines are rarely operated under full load, (>80% of the full load) and certainly not at low ambient temperatures when the streets may be icy so that ice formation on the throttle valve is practically impossible. With the extension of the operating range of the partial load venting system to at least 80% of full engine load, the possibility of ice formation at the throttle valve is practically eliminated since engines are not operated in this operating range at low ambient temperatures. An expensive heating system for the throttle valve is therefore not needed.

In a particularly advantageous embodiment of the invention, the aspiration line is partially integrated into the full load venting line. As a result, there is no need for a separate connection of the aspiration line to the intake duct of the internal combustion engine.

Preferably, throttles are disposed in the partial load venting line and in the aspiration line and the throttles are arranged adjacent relatively warm engine components such as an oil separator whereby even the slight remaining chance of ice formation in the throttles can be eliminated.

The invention will become more readily apparent from the following description thereof on the basis of the accompanying drawings.

BRIEF DESCRIPTION OF THE DRAWINGS

The sole FIGURE is a schematic representation of an engine crankcase venting system according to the invention.

DESCRIPTION OF A PREFERRED EMBODIMENT

In the figure, an internal combustion engine crankcase is designated by the numeral 1, its cylinder head is designated by the numeral 2, the cylinder head 2 being connected to an air intake system 3. The air intake system 3 includes an intake duct 4 mounted on the cylinder head 2 and a suction pipe 5 which is connected to the intake duct 4 and which includes an air mass flow sensor 7. The suction pipe 5 is in communication with an air filter 8 of the air intake system 3.

During operation of a piston engine vent gases, that is so-called blow-by gases are collected in the crankcase 1 which include atomized oil. For the venting of these gases from the crankcase, the internal combustion engine includes a venting system having a partial load venting line 9 and a full load venting line 10 each of which includes an oil separator 11, 12. By way of the venting lines 9, 10, the venting gases are vented from the crankcase 1 and are supplied to the intake system 3 while oil particles of the vent gases are separated and deposited in the oil separators 11, 12. The oil particles removed from the vent gases are returned to the oil pan of the crankcase 1 in a way which is not shown in the drawing.

During engine idling and partial load engine operation, the crankcase is vented by way of the partial load venting line 9, the vent gases being returned Lo the engine by way of the intake duct 4 downstream of the throttle valve 6. In order to maintain a certain small vacuum in the crankcase, the partial load venting line 9 includes a throttle 13 which limits the amount of gases sucked out of the crankcase 1. In addition, fresh air is supplied to the crankcase by way of the full load venting line 10. The path of the venting gases is shown by dash-dotted arrows while the path of the fresh air is indicated by solid line arrows.

During full load operation of the internal combustion engine, the crankcase 1 is vented by way of the full load venting line 10 such that the vent gases from the crankcase 1 enter the suction pipe 5 upstream of the throttle valve 6 and are then returned to the engine by way of the throttle valve 6 and the intake duct 4. The path of the vent gases is shown in the figure by dashed line arrows.

In order to extend the operational range of the partial load venting procedure from idling of the engine to almost full load operation of the engine an aspiration line 14 branches off the full load vent line 10 and is connected to the partial load vent line 9. Of course, the aspiration line 14 may be a separate line extending from the suction pipe 5. In any case, the aspiration line 14 includes a throttle 15. During idling and partial load operation of the internal combustion engine fresh air from the aspiration line 14 is supplied, by way of the throttle 15 to the partial load vent line 9 downstream of the throttle 13 in order to limit the vacuum in the partial load vent line 9. The throttle 15 disposed in the aspiration line 14 limits the amount of fresh air supplied to the partial load vent line 9 that is to prevent the development of an excessive vacuum in the partial load venting line. The cross-sections of the throttles 13, 15 are so tuned with regard to each other that venting takes place only by way of the partial load vent line from idling to almost full load engine operation. Only when the throttle valve 6 is almost fully opened, the vacuum in the partial load vent system and consequently, the amount of vent gases drawn out of the crankcase 1 becomes so small that the full load venting system becomes increasingly effective so that, under full load, that is when the throttle valve 6 is fully opened, essentially only the full load venting system is effective.

Condensate which may form when the fresh air and the vent gases meet can lead to the formation of ice in the area of the throttle valve if the ambient temperature is low. Since the throttle valve 6 is included in the circuit which includes vent gases and fresh air only during operation of the engine under full load, the possibility of ice formation in the throttle valve exists only in a very small operating range of the engine, that is during operation of the engine at a load of greater than 80% of full load. However, this range is practically not used at low ambient temperatures.

In order to prevent ice formation in the throttles 13, 15 in the vent lines 9, 10 under any circumstances, the throttles 13, 15 disposed in suction lines 16, 17 of the oil separation 11, 12, which are connected to the air intake system 3 of the internal combustion engine may be arranged in or adjacent to warm engine components such that no ice is formed in the throttles 13, 15. The throttles 13, 15 which are also called duo-throttles are solid state devices which are formed by a bore of a predetermined diameter; however they may be dynamic, that is, they may be adjustable valves.

What is claimed is:

1. A crankcase venting system for an internal combustion engine having an engine intake duct including a throttle valve, a partial load venting line extending from said engine to said intake duct downstream of said throttle valve and including a vent line throttle, a full load venting line extending from said engine and leading to said intake duct upstream of said throttle valve, and an aspiration line extending between said intake duct upstream of said throttle valve and leading to said partial load venting line, said aspiration line including an aspiration line throttle for controlling the aspiration air flow to said partial load venting line so as to prevent the development of an excessive vacuum in said partial load venting line.

2. A crankcase venting system according to claim 1, wherein said aspiration line is connected to said full load venting line and is connected to said partial load venting line downstream of said vent line throttle disposed in said partial load vent line.

3. A crankcase venting system according to claim 1, wherein said venting lines each include an oil separator.

4. A crankcase venting system according to claim 1, wherein said throttles are disposed in warm areas of said engine so that ice formation in the throttles is prevented.

* * * * *